US012190211B2

United States Patent
Tschiatschek et al.

(10) Patent No.: US 12,190,211 B2
(45) Date of Patent: *Jan. 7, 2025

(54) PRIVACY ENHANCED MACHINE LEARNING

(71) Applicant: Microsoft Technology Licensing, LLC, Redmond, WA (US)

(72) Inventors: Sebastian Tschiatschek, Cambridge (GB); Olga Ohrimenko, Cambridge (GB); Shruti Shrikant Tople, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 190 days.

This patent is subject to a terminal disclaimer.

(21) Appl. No.: 17/829,327

(22) Filed: May 31, 2022

(65) Prior Publication Data

US 2022/0343111 A1 Oct. 27, 2022

Related U.S. Application Data

(63) Continuation of application No. 16/687,095, filed on Nov. 18, 2019, now Pat. No. 11,366,980.

(30) Foreign Application Priority Data

Sep. 20, 2019 (GB) .................................... 1913601

(51) Int. Cl.
*G06N 20/00* (2019.01)
*G06F 18/21* (2023.01)
(Continued)

(52) U.S. Cl.
CPC ......... *G06N 20/00* (2019.01); *G06F 18/2115* (2023.01); *G06F 18/2148* (2023.01); *G06F 18/2185* (2023.01); *G06F 21/6245* (2013.01)

(58) Field of Classification Search
CPC . G06N 20/00; G06N 5/01; G06N 3/08; G06F 18/2115; G06F 18/2148; G06F 18/2185; G06F 21/6245; G06F 21/57
(Continued)

(56) References Cited

U.S. PATENT DOCUMENTS 10,430,727 B1 * 10/2019 Fusillo ................... G06N 20/00
10,811,139 B1 * 10/2020 Wang ..................... G06N 20/20
(Continued)

FOREIGN PATENT DOCUMENTS

CN       109791631 A      5/2019
WO       WO-2019209753 A1 * 10/2019 ........... A61K 35/741

OTHER PUBLICATIONS

Office Action Received for China Application No. 202080065917.3, mailed on Oct. 10, 2024, 10 pages.

*Primary Examiner* — Mahendra R Patel
(74) *Attorney, Agent, or Firm* — Barta Jones, PLLC

(57) ABSTRACT

A method of selecting data for privacy preserving machine learning comprises: storing training data from a first party, storing a machine learning model, and storing criteria from the first party or from another party. The method comprises filtering the training data to select a first part of the training data to be used to train the machine learning model and select a second part of the training data. The selecting is done by computing a measure, using the criteria, of the contribution of the data to the performance of the machine learning model.

20 Claims, 8 Drawing Sheets

(51) Int. Cl.
   *G06F 18/2115*   (2023.01)
   *G06F 18/214*    (2023.01)
   *G06F 21/62*     (2013.01)

(58) Field of Classification Search
   USPC .......................................................... 382/159
   See application file for complete search history.

(56)   References Cited

U.S. PATENT DOCUMENTS

| | | | |
|---|---|---|---|
| 11,222,138 B2* | 1/2022 | Mohassel | A63B 21/222 |
| 11,569,981 B1* | 1/2023 | Mishra | G06F 21/64 |
| 11,755,743 B2* | 9/2023 | Sharma | G06F 21/55 |
| | | | 726/25 |
| 2017/0091937 A1* | 3/2017 | Barnes | G06V 10/771 |
| 2017/0372226 A1 | 12/2017 | Costa et al. | |
| 2018/0189228 A1 | 7/2018 | Park et al. | |
| 2018/0218171 A1* | 8/2018 | Bellala | G06F 21/6254 |
| 2019/0179271 A1 | 6/2019 | Modi | |
| 2019/0197194 A1* | 6/2019 | Larusson | G06N 20/00 |
| 2019/0259293 A1* | 8/2019 | Hellman | G06F 16/40 |
| 2020/0005157 A1* | 1/2020 | Rosenstein | G06N 5/01 |
| 2021/0019665 A1* | 1/2021 | Gur | G06N 20/00 |

* cited by examiner

PRIVACY ENHANCED MACHINE LEARNING

CROSS-REFERENCE TO RELATED APPLICATION

This application is a continuation application of and claims priority to U.S. patent application Ser. No. 16/687,095, entitled "PRIVACY ENHANCED MACHINE LEARNING," filed on Nov. 18, 2019, the disclosure of which is incorporated herein by reference in its entirety.

BACKGROUND

In machine learning, in particular deep learning, the main obstacle for training well-performing machine learning models often is the limited availability of sufficient diverse labeled training data. However, the data needed to train good models often exists but is not easy to leverage as it is distributed and owned by multiple parties. For instance, in the medical domain, important data about patients that could be used for learning diagnostic support systems for cancer might be in possession of different hospitals, each of which holds different data from a specific geographical region with different demographics.

The embodiments described below are not limited to implementations which solve any or all of the disadvantages of known machine learning systems.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a method of selecting data for privacy preserving machine learning comprising: storing training data from a first party, storing a machine learning model, and storing criteria from the first party or from another party. The method comprises filtering the training data to select a first part of the training data to be used to train the machine learning model and select a second part of the training data. The selecting is done by computing a measure, using the criteria, of the contribution of the data to the performance of the machine learning model.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

As mentioned above, in the medical domain, important data about patients that could be used for learning diagnostic support systems for cancer might be in possession of different hospitals, each of which holds different data from a specific geographical region with different demographics. By pooling the available data, the hospitals could train better machine learning models for their application than they could using only their own data. As all hospitals would benefit from a better machine learning model obtained through data sharing, there is a need for collaborative machine learning.

Naturally, this type of collaboration raises technical challenges relating to one or more of: security of individual party's data, privacy of individual party's data, quality of machine learning results. It is difficult to deploy a collaborative machine learning system which will respect integrity of an individual party's data. Integrity in this context involves ensuring that a party's training data is not modified during the collaborate training and that it was indeed the data the party submitted which was used for collaborative training.

Figure 1:
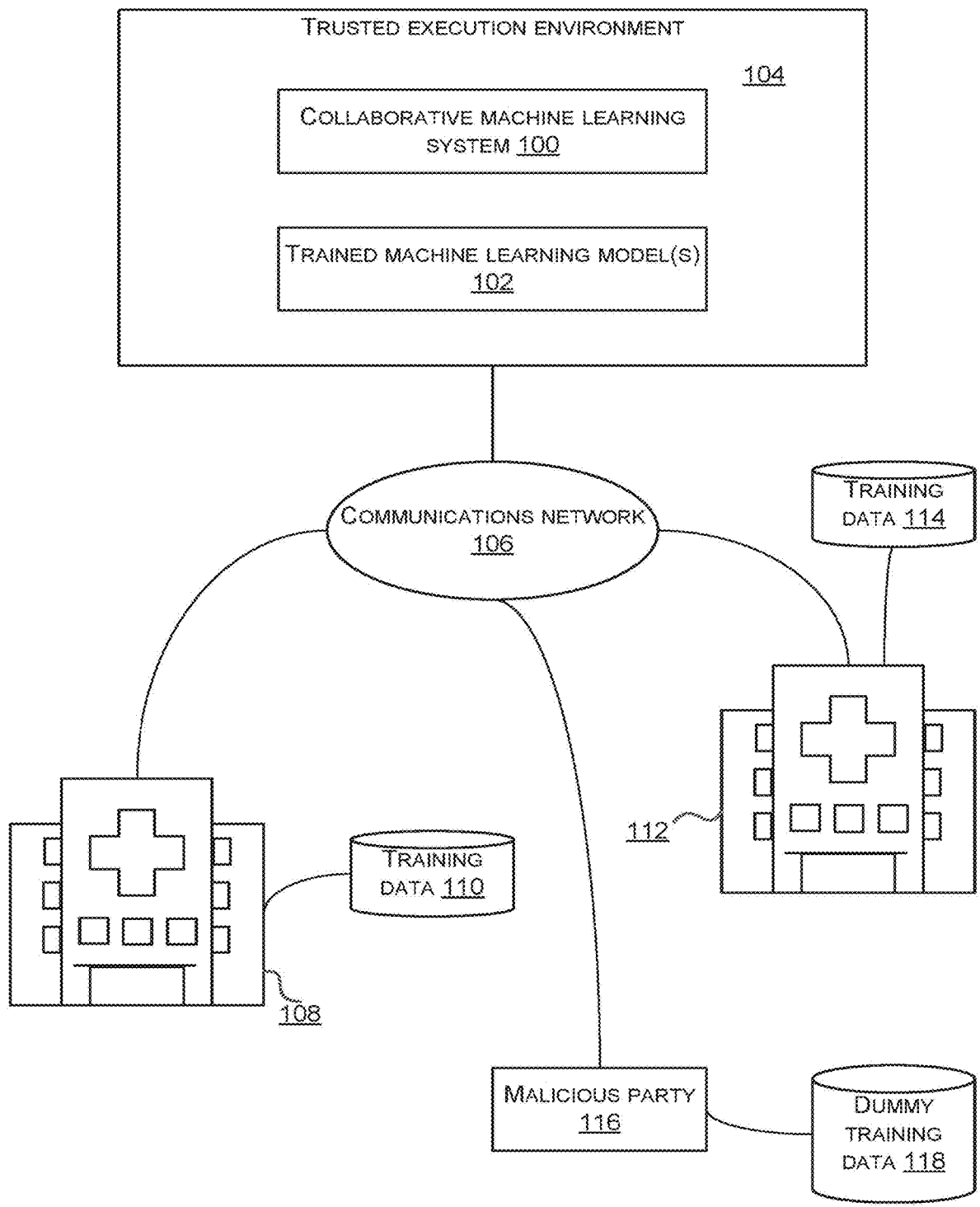
FIG. 1 is a schematic diagram of a multi-party machine learning system being used by two hospitals.

Although FIG. 1 is described and illustrated herein as being implemented for use by hospitals, the system described is provided as an example and not a limitation. As those skilled in the art will appreciate, the present examples are suitable for application in a variety of different types of multi-party machine learning scenarios.

FIG. 1 is a schematic diagram of a multi-party machine learning system 100 being used by two hospitals 108, 112. The multi-party machine learning system 100 is deployed in a trusted execution environment 104 in the cloud or at any location in communication with the hospitals via a communications network 106 such as the internet, an intranet or any other communications network 106. The trusted execution environment 104 is implemented using secure hardware and/or software and comprises at least one secure memory region. In this example one trusted execution environment 104 is shown for clarity although in practice many trusted execution environments 104 are potentially deployed and these are at computation units in a data center, such as servers with disk storage or virtual machines which are connected by a network within a data center. Where there are many trusted execution environments 104 the multi-party machine learning system 100 is distributed amongst them.

In an example the trusted execution environment 104 comprises a secure memory region which is a processor protected memory region within the address space of a regular process. The processor monitors memory accesses to the trusted execution environment so that only code running in the trusted execution environment 104 is able to access data in the trusted execution environment 104. When inside the physical processor package (in the processor's caches), the trusted execution environment 104 memory is available in plaintext, but it is encrypted and integrity protected when written to system memory (random access memory RAM). External code can only invoke code inside the trusted execution environment at statically defined entry points (using a call-gate mechanism).

In some examples the trusted execution environment 104 is implemented using hardware such that the secure memory region is isolated from any other code, including operating system and hypervisor. In some examples the trusted execution environment 104 is implemented using a trusted virtual machine.

Within the trusted execution environment 104 are one or more trained machine learning models 102 which have been computed by the multi-party machine learning system 100 using training data from a plurality of parties, such as a first hospital 108 and a second hospital 112 in the example of FIG. 1. A first hospital 108 has training data 110 such as medical images of patients where the medical images are labelled as depicting cancer or not. The training data 110 is confidential and stored securely at the first hospital. The training data 110 is encrypted and uploaded to the trusted execution environment 104 when the hospital wants to participate in multi-party machine learning.

A second hospital 112 has training data 114 comprising medical images of different patients where the medical images are labelled as depicting cancer or not. The training data 114 is confidential and stored securely at the second hospital. The training data 114 is encrypted and uploaded to the trusted execution environment 104 when the second hospital wants to participate in multi-party machine learning.

One or more malicious parties such as malicious party 116 are potentially present and have dummy training data 118. Dummy training data is any training data which is poor quality such as by having inaccurate labels, or being a repeat of training data which has already been uploaded to the trusted execution environment by that party.

One or more parties upload training data to the trusted execution environment 104. The multi-party machine learning system 100 uses at least some of the training data to train one or more machine learning models 102. One or more of the parties is then able to access the trained machine learning model and use it to compute predictions to label a medical image for tumor detection, or for other tasks depending on the application domain. In this way a first party, such as hospital one, is able to benefit from a high performing machine learning model which has been trained using data from a plurality of parties. If the first party had used only its own training data the resulting machine learning model would have been of low performance where the amount and/or variety of data is generally lower than that available to multiple parties.

The multi-party machine learning system of FIG. 1 allows multiple parties to jointly train machine learning models based on the training data provided by all of the parties and achieve improved performance on their own tasks. The multi-party machine learning system supports a single validation task scenario, for example, where hospitals bring together their data to train a single model for detecting cancer. Furthermore, it also supports scenarios where one party's data contributes to multiple tasks.

Suppose the training data from the first hospital 110 and the second hospital 112 is uploaded to the trusted execution environment 104 and used by the multi-party machine learning system to train one or more of the machine learning models 102. Suppose that the resulting trained machine learning models 102 are then made accessible to the first and second hospital via the communications network 106. It is then possible for the first hospital to discover information about the training data which was used to train the machine learning models 102. Thus the first hospital is able to discover confidential training data of the second hospital. Attacks where confidential training data is obtained from prediction application programming interfaces are known, such as described in Tramer et al. "Stealing machine learning models via prediction APIs" in USENIX Security 2016.

Various examples described herein use a selector component within the multi-party machine learning system in order to enhance privacy. The selector component selects a first part of the training data from the training data uploaded by the multiple parties, and uses only the first part of the training data to train one or more machine learning models. A second part of the training data is kept private in the trusted execution environment. The selection is done according to one or more criteria submitted by the individual parties. In this way at least some of the training data which has been uploaded to the trusted execution environment 104 is not used for training a particular machine learning model instance. Privacy is thus enhanced since the training data which was not used cannot be discovered by a malicious party who accesses the trained machine learning model. By careful design of the selection process the performance of the machine learning model is unaffected, despite some but not all the training data being used. In some cases the criteria comprise validation data and use of the selector gives a benefit that only the information relevant to a validation task of the validation data is released through the model, limiting the possibility of copying and reusing the training data for other tasks.

Various examples described herein use a participation controller within the multi-party machine learning system in order to enhance quality of the resulting trained machine learning models 102 and to prevent spoofing attacks where malicious parties such as malicious party 116 of FIG. 1 use dummy training data (such as training data which has already been used) to gain access to the trained machine learning models 102. The participation controller computes a measure of the contribution of an individual party to a particular trained machine learning model and uses the measure to control access to that or other machine learning models.

Figure 2:
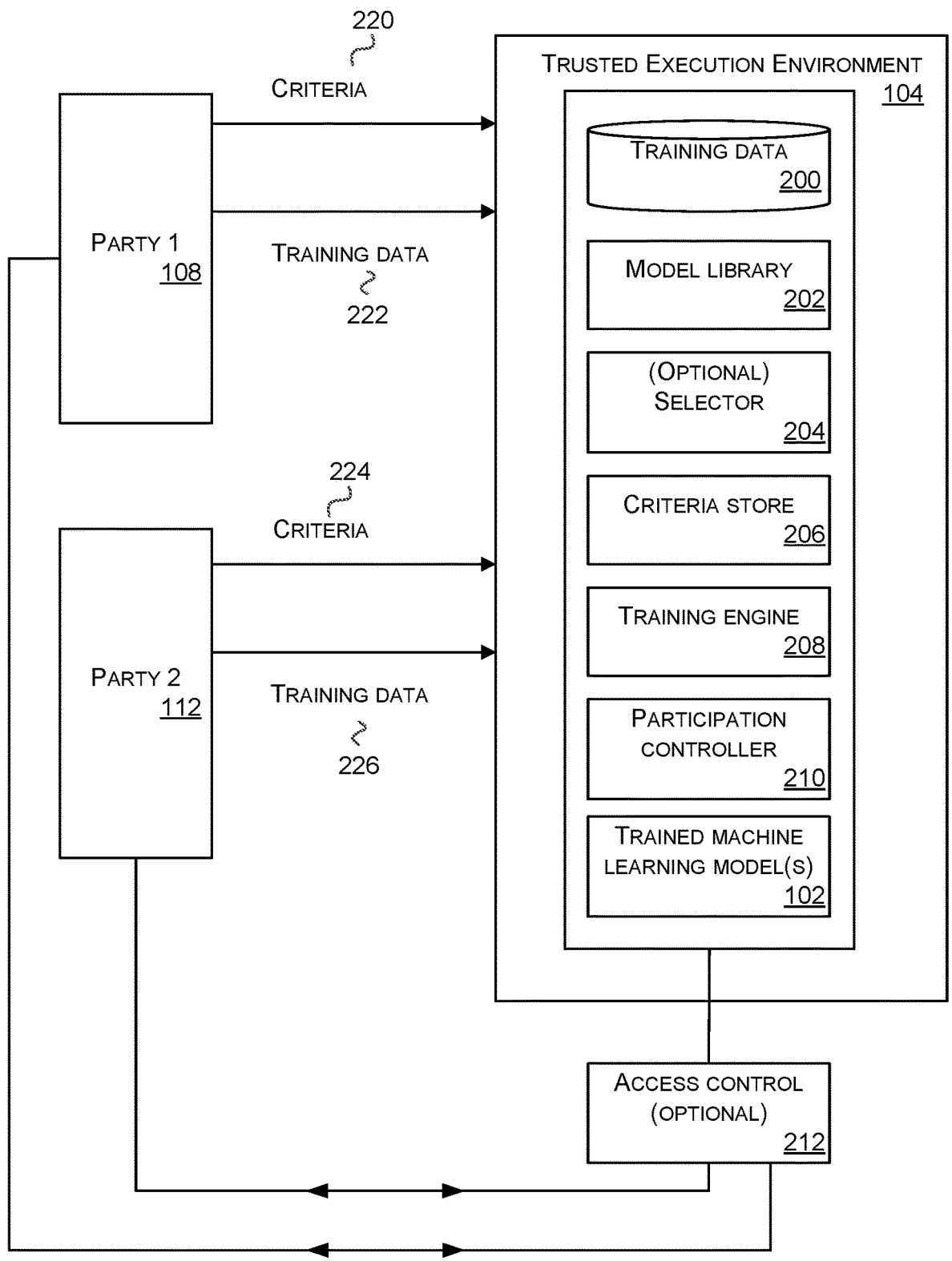
FIG. 2 is a schematic diagram of the multi-party machine learning system of FIG. 1 in more detail.

FIG. 2 is a schematic diagram of a multi-party machine learning system such as that of FIG. 1 in more detail. Trusted execution environment 104 comprises a multi-party machine learning system 100.

The multi-party machine learning system 100 comprises a memory storing training data 200 and storing a model library 202 comprising at least one machine learning model. The multi-party machine learning system 100 optionally comprises a selector 204, and it comprises a criteria store 206, a training engine 208, a participation controller 210 and a store to hold one or more trained machine learning models 102 computed by the training engine 208.

The stored training data 200 is stored in plain text since the store is within a trusted execution environment. The training data 200 comprises a plurality of examples such as images, videos, documents, sensor data values, or other training examples. The training data 200 comprises labelled training data in the case that supervised training is used by the training engine 208 and/or un-labelled training data where unsupervised training is used. The stored training data 200 has been received at the trusted execution environment 104 from two or more parties. In FIG. 2 two parties are shown 108, 112 although in practice there may be more parties. When a party uploads training data the training data is encrypted. The stored training data 200 at the trusted execution environment is tagged or marked to indicate which party it originated from.

The model library 202 is a store of one or more machine learning models such as neural networks, random decision forests, support vector machines, classifiers, regressors or other machine learning models.

The selector 204 is optional and is included in cases where the multi-party machine learning system is to enhance privacy by selecting some but not all of the training data 200 to be used in training a particular instance of a machine learning model. The selector uses one or more criteria provided by individual ones of the parties. FIG. 2 shows party 1 uploading criteria 220 and training data 222 to the trusted execution environment. It also shows party 2 uploading criteria 224 and training data 226 to the trusted execution environment.

A criteria store 206 holds the criteria uploaded by individual ones of the parties. A criteria is a quality, threshold, value, measure, statistic or other criteria for use in selecting training data and/or indicating a performance level of a machine learning model.

The training engine 208 is one or more training processes for training the machine learning models from the model library 202. The training processes are conventional, well known training processes in some examples.

The participation controller 210 comprises functionality for computing a measure of contribution of individual parties training data to performance of a particular trained machine learning model. In some examples the participation controller uses the criteria. More detail about the participation controller is given later in this document.

The trained machine learning models 102 are stored architectures, parameter values and other data which specifies individual trained machine learning models.

An access controller 212 is a firewall, network card, or other functionality which enables access to the trained machine learning models 102 by the individual parties 108, 112 to be controlled.

The selector of the multi-party machine learning system operates in an unconventional manner to enhance privacy of a trained machine learning model without detrimenting performance of the machine learning model.

The selector of the multi-party machine learning system improves the functioning of the underlying computing device by selecting a first part of the training data to be used to train the machine learning model and selecting a second part of the training data to be kept private, in such a way as to maintain performance of the trained machine learning model.

The participation controller of the multi-party machine learning system operates in an unconventional manner to secure access to a trained machine learning model.

The participation controller of the multi-party machine learning system improves the functioning of the underlying computing device by improving security of access to a trained machine learning model and preventing spoofing attacks whereby malicious parties spoof training data to attempt to gain access to a the trained machine learning model.

Alternatively, or in addition, the functionality described with reference to FIG. 2 herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 3:
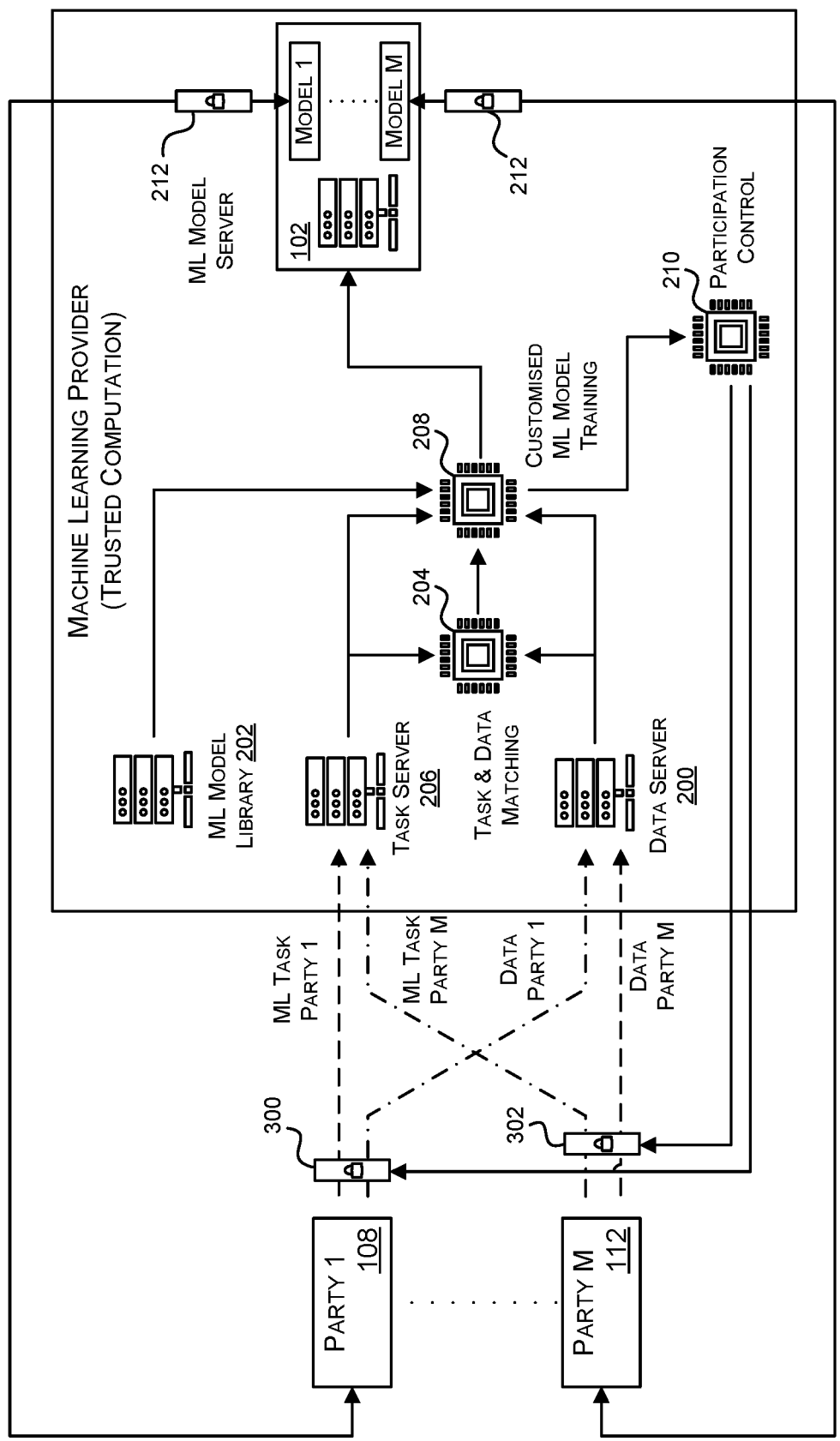
FIG. 3 is a schematic diagram of another multi-party machine learning system.

FIG. 3 is a schematic diagram of another multi-party machine learning system which is very similar to that of FIG. 2 and where the same components have the same reference numerals. In this example the criteria uploaded by each party is a task where a task is validation data for validating a machine learning task. As shown in FIG. 3, party 1 108 uploads encrypted training data to training data server in the trusted execution environment and it uploads a task (in this example, the task is validation data) to criteria store 206 (referred to as task server in FIG. 3). There are a plurality of parties each of which is able to participate in the multi-party machine learning only if it uploads a criteria, such as a task (i.e. validation data in this case) to the multi-party machine learning system. Party M 112 uploads encrypted training data to training data server in the trusted execution environment and it uploads a task (in this example, the task is validation data) to criteria store 206 (referred to as task server in FIG. 3). Padlocks 300, 302 in FIG. 3 represent access control mechanisms such as a firewall, network card, software or other access control which prevents each party from accessing the multi-party machine learning system unless it has uploaded criteria, such as validation data in this example.

Using the uploaded training data the multi-party machine learning system carries out machine learning. In some examples it trains a single machine learning model which is then potentially accessible by each of the parties. In some examples it trains a plurality of machine learning models, one for each of the parties.

In some examples a task and data matching component which is the selector 204 of FIG. 2 is used. The selector uses the uploaded criteria to select which items of training data to use in training particular ones of the models and to select which items of training data to keep private and not use for training particular ones of the models. As mentioned above a criteria is a quality, threshold, value, measure, statistic or other criteria for use in selecting training data and/or indicating a performance level of a machine learning model. In an example, a criteria comprises validation data and in that case, the validation data is used to assess performance of the trained machine learning model in a conventional manner. In an example, a criteria comprises a quality such as roundness where images depicting round objects are known to be better for training a machine learning system for a particular outcome. In an example, a criteria comprises a number of corrupted bits where audio signals with a high level of corrupted bits are known to be worse for training a machine learning system for a particular outcome.

A customized machine learning model training component is the same as the training engine 208 of FIG. 2. It trains a machine learning model from the machine learning model library 202 using the selected training data. The output of the training engine 208 is stored trained machine learning models 102.

The stored trained machine learning models 102 are accessible via padlocks in FIG. 3 which are the access controller 212 of FIG. 2. The participation controller 210 computes scores which indicate whether or not (and optionally for how long) individual parties are able to access individual ones of the trained machine learning models 102.

The apparatus of FIG. 3 is shown for a particular instance in time since the number of parties varies over time as different parties leave or join the multi-party machine learning system. Thus the training data at store 200, the criteria at store 206 and the trained machine learning models at store 102 vary over time as the apparatus is in operation. It is possible for a party to begin with access to individual ones of the machine learning models but to lose that access over time (and potentially regain access again) depending on the results of computation of the participation controller 210. A party is able to participate in the multi-party machine learning system provided it submits criteria.

Figure 4:
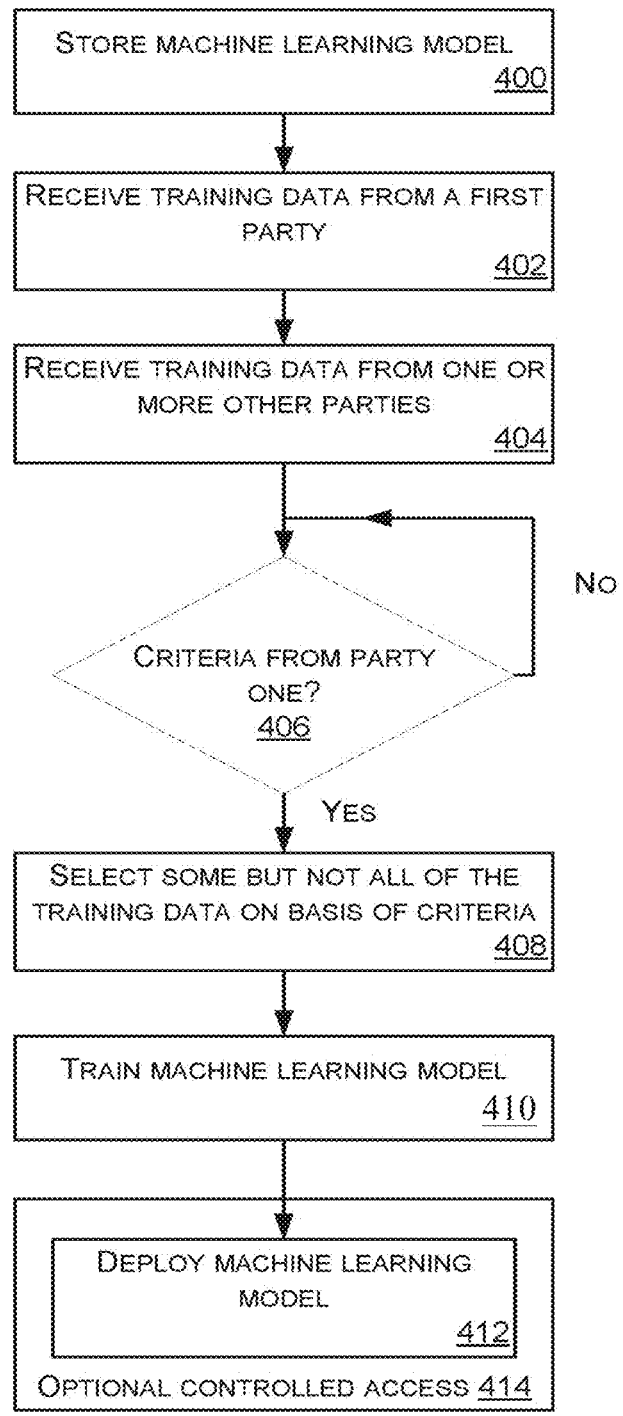
FIG. 4 is a flow diagram of a method performed by a multi-party machine learning system for privacy preserving training, where there is a single machine learning model being trained.

FIG. 4 is a flow diagram of a method performed by a multi-party machine learning system for privacy preserving training, where there is a single machine learning model being trained. A machine learning model is stored 400 such as by selecting a machine learning model from the model library 202 according to one or more rules, or according to a selection parameter value given by one of the parties. Training data is received 402 from a first party such as party 1 of FIG. 2 and training data is received 404 from one or more other parties such as party 2 of FIG. 2.

The multi-party machine learning system 100 checks 406 whether criteria have been received from party one. If not, the multi-party machine learning system waits and continues to check for arrival of the criteria. If criteria have been received from party one the process proceeds by using the selector 204. The selector selects a first part of the training data to be used for training the stored machine learning model. The selector selects 408 a second part of the training data to be kept private and not used for training the stored machine learning model. The selection is done on the basis of the criteria from party 1.

The multi-party machine learning system trains 410 the stored machine learning model using the first part of the training data. The selection is done using the criteria in a manner so as not to detriment performance of the resulting trained model, as compared with the performance had the model been trained using all the available training data.

The resulting trained machine learning model is deployed 412 in some examples by retaining it in the trusted execution environment and allowing access to the trained machine learning model via access controller 212. Parties who send queries to and obtain results from the trained machine learning model in the trusted execution environment are unable to reverse engineer the training data which was kept private and not used to train the machine learning model. In some cases the ability of parties to send queries to and obtain results from the trained machine learning model is controlled 414 using access controller 212 and scores from the participation controller 208 as described in more detail later in this document.

The resulting trained machine learning model is deployed 412 in some examples by installing it on end user devices or on servers outside the trusted execution environment. In this case security is enhanced as compared with deploying the trained machine learning model after training it on all the available training data. Malicious parties who attack the deployed machine learning model to obtain the training data which was used are unable to obtain the training data which is kept private in the trusted execution environment.

Figure 5:
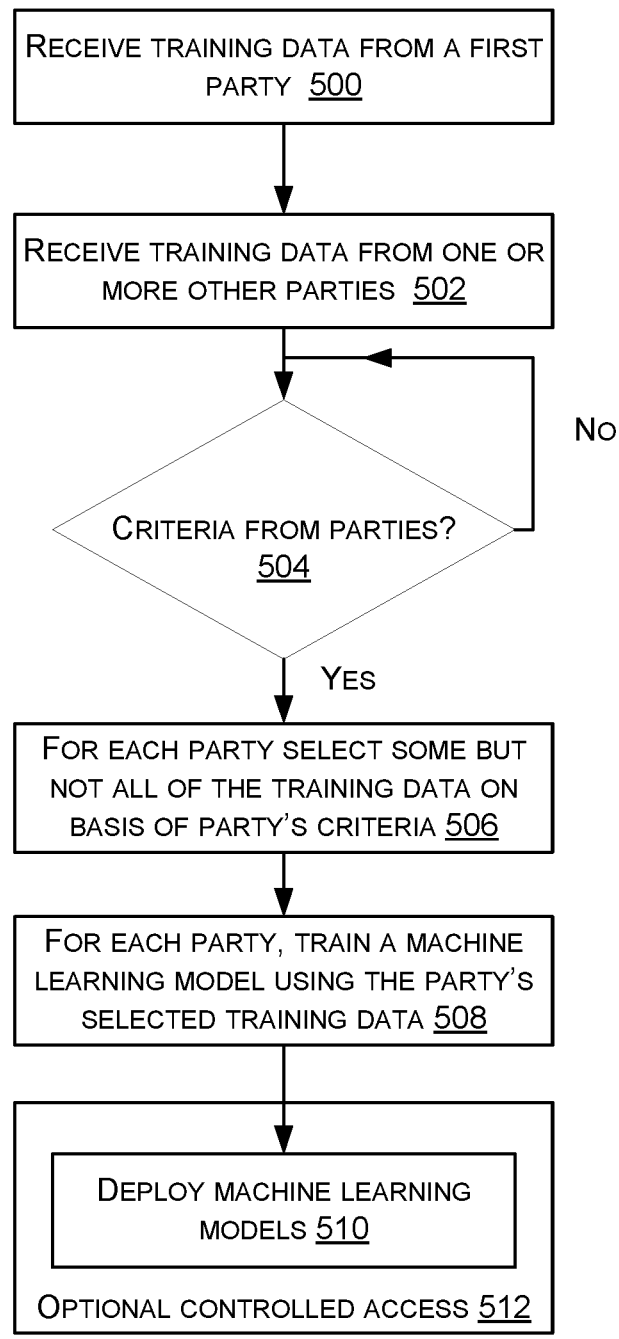
FIG. 5 is a flow diagram of a method performed by a multi-party machine learning system for privacy preserving training, where there are a plurality of machine learning models being trained.

FIG. 5 is a flow diagram of a method performed by a multi-party machine learning system for privacy preserving training, where there are a plurality of machine learning models being trained. An example where there is one machine learning model per party is given in FIG. 3.

The multi-party machine learning system receives 500 training data from a first party and receives 502 training data from one or more other parties. The multi-party machine learning system checks 504 if it has received criteria from the parties. Each party who has submitted criteria is able to participate. An entity who has not submitted criteria is prevented from accessing the multi-party machine learning system using access control 300, 302 of FIG. 3 and is therefore not a party.

For each party, the multi-party machine learning system selects 506 some but not all of the training data on the basis of the criteria of the respective party. For each party, the multi-party machine learning system trains 508 a machine learning model using the appropriate selected training data.

Once the individual machine learning models have been trained they are deployed 510. Deployment of an individual model is achieved by enabling access controller 212 to let the party associated with the individual model send queries and receive responses from the individual model. In some cases the access is controlled 512 on the basis of scores computed by participation controller 210 as described below. But it is not essential for the participation controller 210 to be used.

Figure 6:
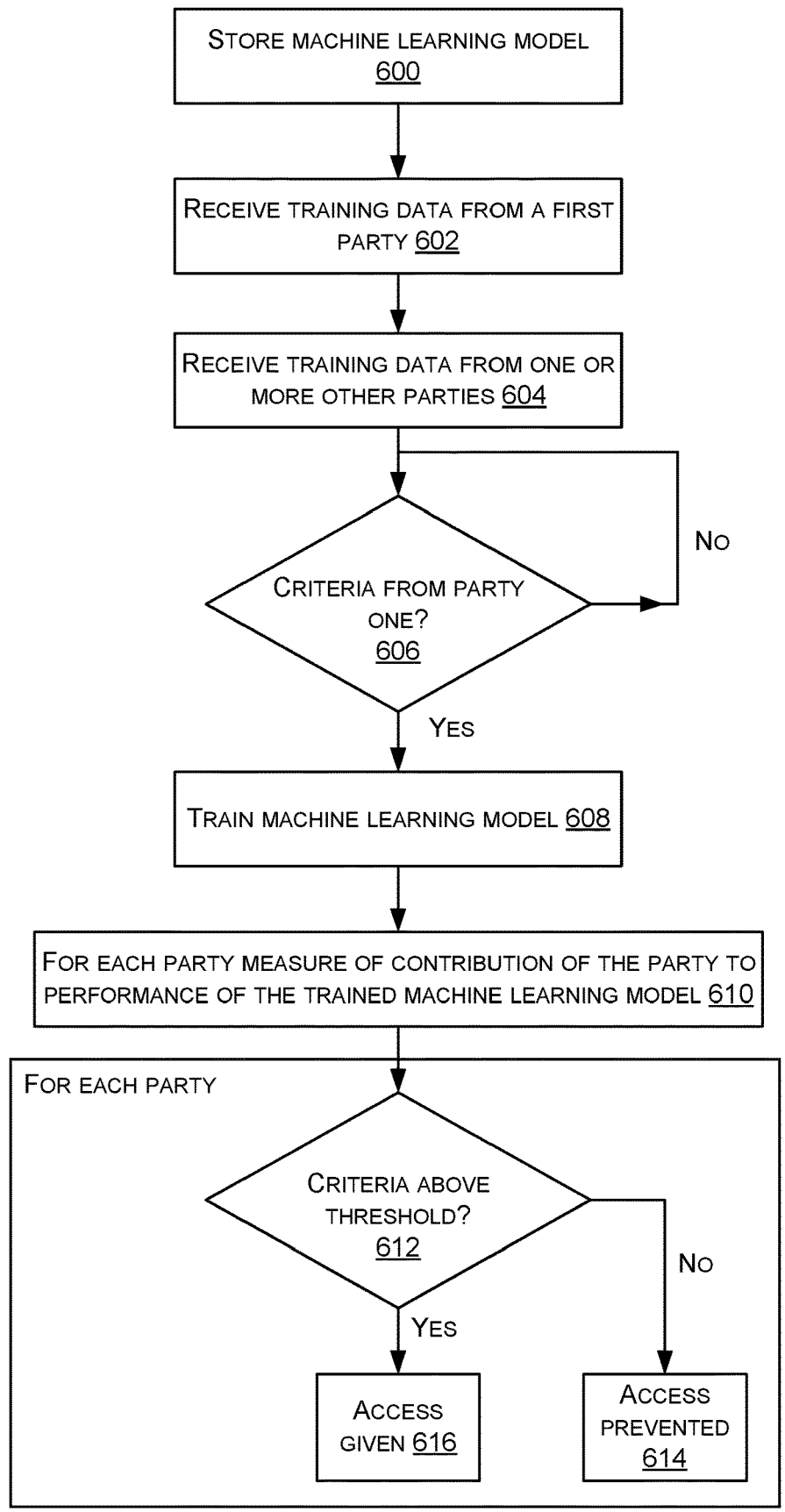
FIG. 6 is a flow diagram of a method of controlling access to a single trained machine learning model.

FIG. 6 is a flow diagram of a method of controlling access to a single trained machine learning model which has been trained by the multi-party machine learning system. The multi-party machine learning system stores 600 a machine learning model. The machine learning model is selected from the model library 202 according to one or more rules, or according to a selection parameter value given by one of the parties. Training data is received 602 from a first party such as party 1 of FIG. 2 and training data is received 604 from one or more other parties such as party 2 of FIG. 2.

The multi-party machine learning system 100 checks 606 whether criteria have been received from party one. If not, the multi-party machine learning system waits and continues to check for arrival of the criteria.

The multi-party machine learning system trains 608 the stored machine learning model using some or all of the training data.

The participation controller computes 610, for each party, a measure of contribution of the training data submitted by the party, to performance of the trained machine learning model. The measure of contribution is computed using the criteria submitted by party 1.

The resulting trained machine learning model is deployed 412 by retaining it in the trusted execution environment and allowing access to the trained machine learning model via access controller 212. The access granted to a party is related to the measure of contribution computed for the party. For each party, a check 612 is made to see if the measure of contribution is above a threshold. If so then access is given 616 to the trained model. If not, access is prevented 614.

In some cases the methods of FIG. 4 and FIG. 6 are combined. That is the machine learning model is trained using selected training data selected as described above with reference to FIG. 4. Then access to the trained model is controlled as described with reference to FIG. 6.

Figure 7:
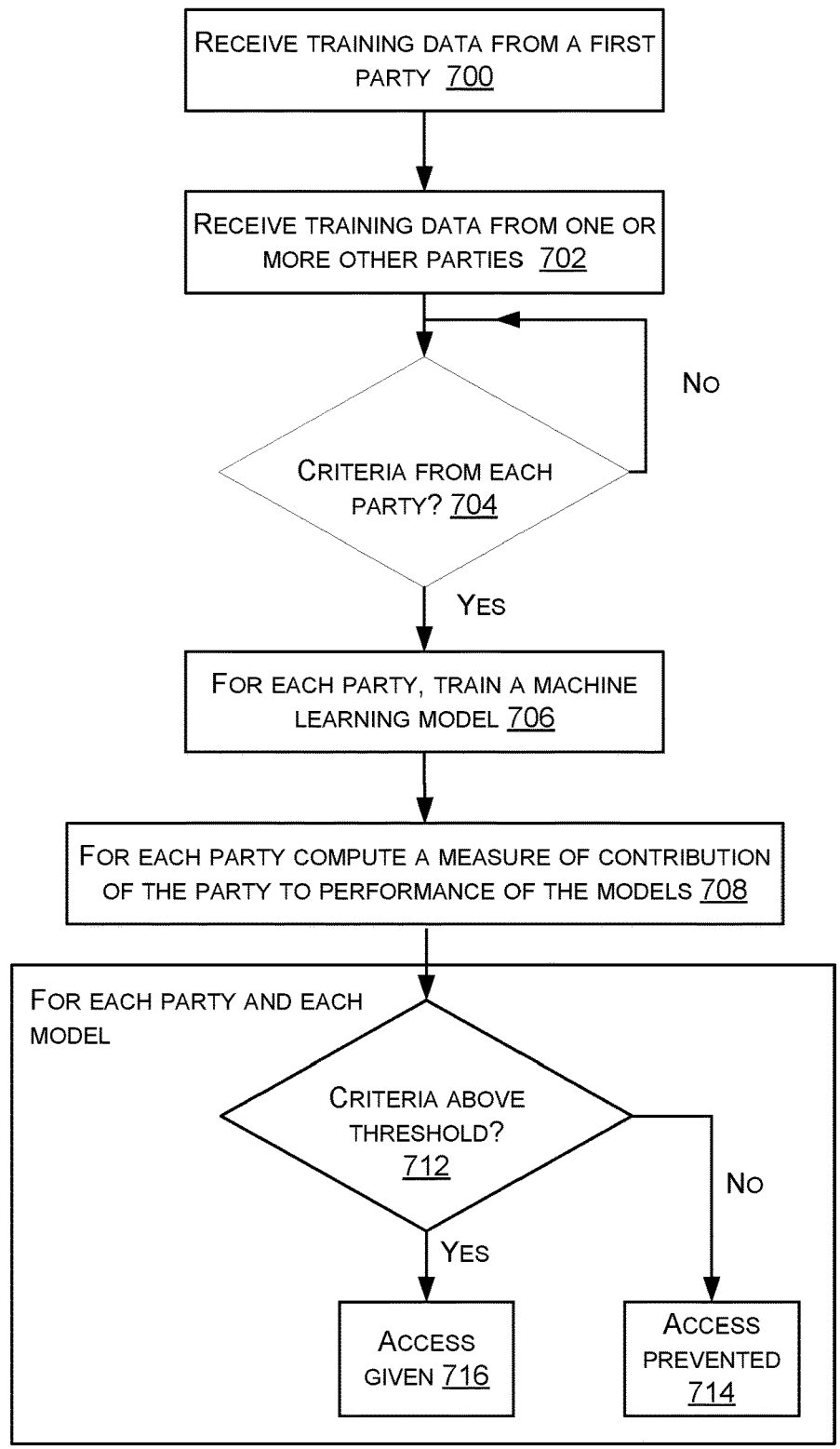
FIG. 7 is a flow diagram of a method of controlling access to a plurality of trained machine learning models.

FIG. 7 is a flow diagram of a method performed by a multi-party machine learning system where there are a plurality of machine learning models being trained and where access to the individual trained models is controlled using a participation controller 210 and access controller 212.

The multi-party machine learning system receives 700 training data from a first party and receives 702 training data from one or more other parties. The multi-party machine learning system checks 704 if it has received criteria from the parties. Each party who has submitted criteria is able to participate. An entity who has not submitted criteria is prevented from accessing the multi-party machine learning system using access control 300, 302 of FIG. 3 and is therefore not a party.

For each party, the multi-party machine learning system trains 706 a machine learning model using all or some of the training data (so potentially it is trained using all the training data submitted by all the parties).

For each party, the multi-party machine learning system computes 708 a measure of contribution of the party's training data to performance of each of the machine learning models.

For each party and each model, the multi-party machine learning system checks 712 to see if the measure of contribution is above a threshold. If so then access is given 716 to the trained model by the particular party. If not, access is prevented 714.

In various examples the selector 204 and the participation controller 210 compute Shapley values. A Shapley value is the output of the following function which takes as arguments a characteristic function and party i. The characteristic function used by the selector 204 is different from the characteristic function used by the participation controller 210.

The Shapley value for characteristic function v and party $i \in M$ is $$\psi(v, i) = \sum_{S \subseteq M \setminus \{i\}} \frac{|S|!(M - |S| - 1)!}{M!} (v(S \cup \{i\}) - v(S)),$$

Which is expressed in words as, the Shapley value for characteristic function v and party i which is a member of the set of M parties of a multi-party machine learning system is given by the sum over each possible set S of the M parties excluding i, of the factorial of the cardinality of set S, times the factorial of the number of parties M minus the cardinality of set S minus 1, divided by the factorial of the number of parties M, times the difference in the output of the characteristic function for S with i and S without i.

A Shapley value quantifies the average marginal contribution of party i with respect to all possible subsets of parties. The inventors have recognized that Shapley values are not robust to replication, that is they don't take into account parties who submit the same training data many times.

The selector 204 uses the following characteristic function when computing Shapley values in both the single machine learning model case and the case with one machine learning model per party:

$$u_i(S) = \mathcal{G}(V_i, \mathcal{M}_{(\cup_{j \in S} X_j)})$$

Which is expressed in words as the characteristic function for use when computing Shapley values by the selector 204 takes as an argument the number of possible sets S of parties, and is equal to the output of gain function $\mathcal{G}$ which expresses the performance of a particular machine learning model $\mathcal{M}$ when assessed using criteria $V_i$ (such as validation data given by party i) after the model $\mathcal{M}$ has been trained using training data $X_j$ available from all the parties in the combination of parties in one of the sets j of the possible sets S. The symbol $u$ is used here to denote the characteristic function in order to represent the use of the gain function $\mathcal{G}$ as the characteristic function.

The participation controller 210 uses the following characteristic function when computing Shapley values in the case with a single machine learning model:

$$v(S) = \underbrace{\mathcal{G}(V; \mathcal{M}_S)}_{\text{performance of the model}} = \sum_{j \in S} \underbrace{[\mathcal{G}(V; \mathcal{M}_S) - \mathcal{G}(V; \mathcal{M}_j)]}_{\text{performance for party } j}$$

Which is expressed in words as the characteristic function for use by the participation controller 210 where there are S possible sets of parties in the multi-party machine learning system, is equal to the performance of the model plus the sum of the performance of the model for each individual party. The notation v is used to refer to the characteristic function used by the participation controller for a single machine learning model.

This characteristic function immediately above is the value of the model trained on all datasets in S plus marginal gains for each party. Note that for a single party the value of the data is expressed as the value of the model trained on its own training dataset.

The participation controller 210 uses the following characteristic function when computing Shapley values in the case with a one machine learning model per party:

$$\omega(S) = \underbrace{\sum_{i \in M} \mathcal{G}(V_i; \mathcal{M}_S^i)}_{\text{perfomance of all models of set } M} + \sum_{i \in S} \underbrace{[\mathcal{G}(V_i; \mathcal{M}_S^i) - \mathcal{G}(V_i; \mathcal{M}_i^i)]}_{\text{performance for party } i}$$

Which is expressed in words as the characteristic function used by the participation controller 210 when computing Shapley values in the case with one machine learning model per party is equal to the sum of the performance of all the models plus the sum of the performance gains of each model for each individual party over each model for each individual party based on only that party's data. The notation ω is used to refer to the characteristic function used by the participation controller in the case of multiple machine learning models.

Figure 8:
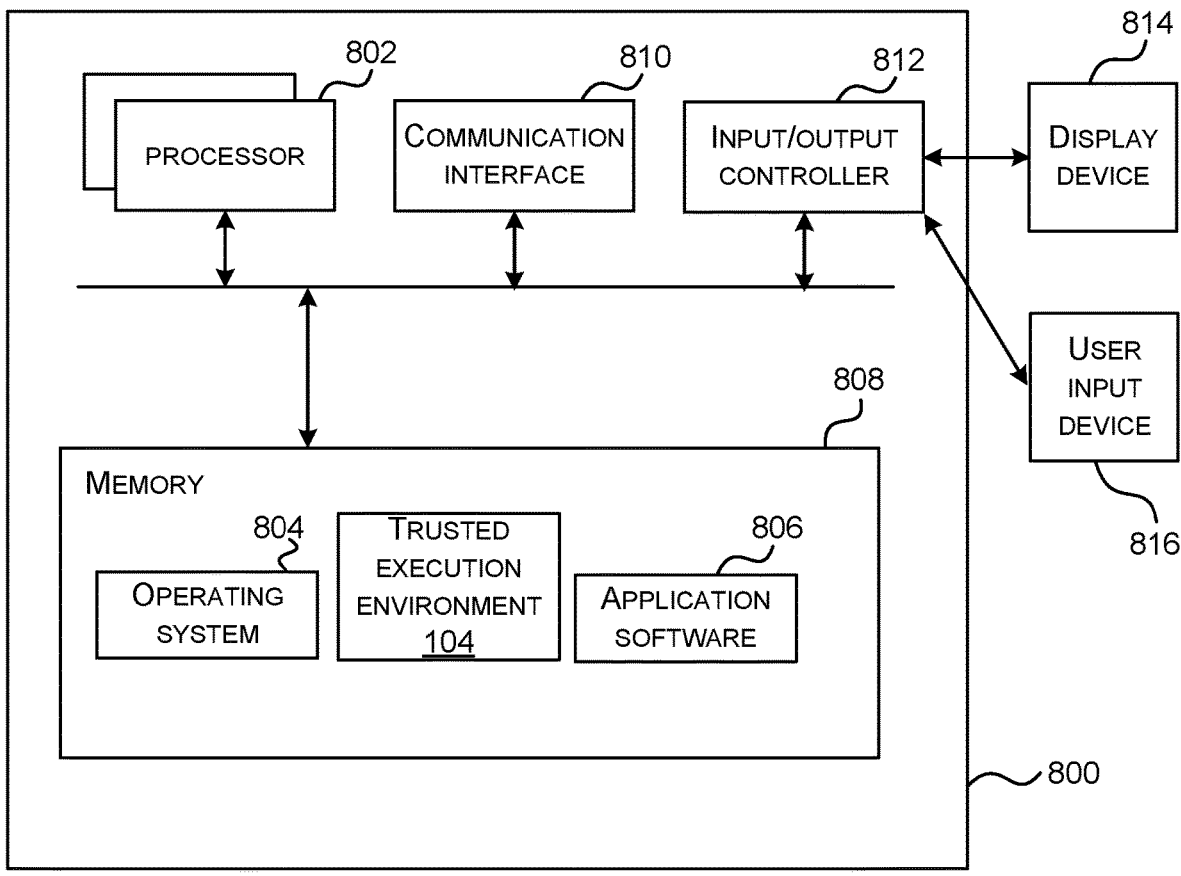
FIG. 8 illustrates an exemplary computing-based device in which embodiments of a multi-party machine learning system are implemented.

FIG. 8 illustrates various components of an exemplary computing-based device 800 which is implemented as any form of a computing and/or electronic device, and in which embodiments of a multi-party machine learning system are implemented in some examples.

Computing-based device 800 comprises one or more processors 802 which are microprocessors, controllers or any other suitable type of processors for processing computer executable instructions to control the operation of the device in order to train one or more machine learning models using training data from one or more parties. In some examples, for example where a system on a chip architecture is used, the processors 802 include one or more fixed function blocks (also referred to as accelerators) which implement a part of the method of any of FIGS. 4 to 7 in hardware (rather than software or firmware). Platform software comprising an operating system 804 or any other suitable platform software is provided at the computing-based device to enable application software 806 to be executed on the device. A trusted execution environment 104 is provided to hold the training data and the machine learning models as described earlier in the document.

The computer executable instructions are provided using any computer-readable media that is accessible by computing based device 800. Computer-readable media includes, for example, computer storage media such as memory 808 and communications media. Computer storage media, such as memory 808, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 808) is shown within the computing-based device 800 it will be appreciated that the storage is, in some examples, distributed or located remotely and accessed via a network or other communication link (e.g. using communication interface 810).

The computing-based device 800 also comprises an input/output controller 812 arranged to output display information to a display device 814 which may be separate from or integral to the computing-based device 800. The display information may provide a graphical user interface. The input/output controller 812 is also arranged to receive and process input from one or more devices, such as a user input device 816 (e.g. a mouse, keyboard, camera, microphone or other sensor).

Alternatively or in addition to the other examples described herein, examples include any combination of the following:

A method of selecting data for privacy preserving machine learning comprising:
  storing training data from a first party;
  storing a machine learning model;
  storing criteria from the first party or from another party;
  selecting the training data to select a first part of the training data to be used to train the machine learning model and select a second part of the training data;
  wherein the selecting is done by computing a measure, using the criteria, of the contribution of the data to the performance of the machine learning model.

In this way privacy is enhanced because the first part of the training data can be used to train the machine learning model without using the second part. Thus the second part cannot be revealed through access to the trained model. By using the criteria to do the selection the performance of the model is facilitated even though it is not trained on all the available training data.

The method described above performed in a trusted execution environment and comprising training the machine learning model using the first part of the training data, such that the second part of the training data is kept private in the trusted execution environment. Security is enhanced by using a trusted execution environment.

The method described above wherein the criteria comprise one or more of: a quality, threshold, value, measure, statistic. These are efficient to compute and store in the multi-party machine learning system since the trusted computing environment is a resource limited entity.

The method described above wherein the criteria is suitable for selecting training data according to likelihood of performance of a machine learning model when trained using the selected training data. In this way performance of the machine learning model is facilitated even though not all the training data available is used. Efficiencies are gained.

The method described above wherein the criteria is suitable for indicating a performance level of a machine learning model.

The method described above wherein the criteria is validation data for validating a machine learning task for which the machine learning model is to be trained.

The method described above wherein the measure is a Shapley value computed using a characteristic function, where the characteristic function is equal to the performance of the machine learning model when assessed using the criteria given by party i after the model has been trained using training data available from all the parties in a combination of parties in one of a plurality of possible sets S of parties. This provides an effective and practical way to select the training data which is found to work well in empirical testing.

The method described above where there are a plurality of machine learning models. Using a plurality of machine learning models gives flexibility and enables different parties to have different models trained.

The method described above comprising computing a measure of contribution of party 1's training data to the performance of the machine learning model and controlling access to the machine learning model on the basis of the computed measure. In this way malicious parties who submit replicated training data and/or poor quality training data are prevented from accessing the results.

The method of described above wherein the measure of contribution is a Shapley value computed using a characteristic function, where the characteristic function is equal to the performance of the machine learning model plus the sum of the performance of the machine learning model for each individual party. The characteristic function used here is found to work well in empirical testing.

The method described above comprising storing a plurality of machine learning models, one per party, and wherein the measure is a Shapley value computed using a characteristic function, where the characteristic function is equal to the sum of the performance of all the machine learning models plus the sum of the performance of each machine learning model for each individual party. The characteristic function used here is found to work well in practice.

An apparatus for selecting data for privacy preserving machine learning comprising:

a memory storing training data from a first party;
the memory storing a machine learning model;
the memory storing criteria from the first party or from another party;
a selector configured to select the training data to select a first part of the training data to be used to train the machine learning model and select a second part of the training data; wherein the selecting is done by computing a measure, using the criteria, of the contribution of the data to the performance of the machine learning model.

An apparatus for controlling access to a machine learning model, the apparatus comprising:
 a trusted computing environment storing the machine learning model and training data;
 an access controller configured to allow or deny access to the machine learning model;
 a memory storing criteria submitted by a party requesting access to the machine learning model;
 a participation controller which computes a score using the criteria;
 and wherein the access controller uses the computed score to allow or deny access to the machine learning model.

The apparatus described above wherein the criteria is suitable for indicating performance of a machine learning model.

The apparatus described above wherein the access controller is configured to prevent a party which submits training data to the trusted computing environment but not criteria to the trusted computing environment from accessing the machine learning model.

The apparatus described above wherein the access controller uses the computed score to grant timed access to the machine learning model, the time being related to the score.

The apparatus described above wherein the training data has been submitted by one or more parties and wherein the access controller prevents access to the machine learning model by a malicious party submitting training data which has already been submitted.

The apparatus described above wherein the participation controller computes the score as a Shapley value using a characteristic function, where the characteristic function is equal to the performance of the machine learning model plus the sum of the performance of the machine learning model for each individual party.

The apparatus described above wherein the trusted computing environment stores a plurality of machine learning models, one per party, and the participation controller computes the score as a Shapley value using a characteristic function, where the characteristic function is equal to the sum of the performance of all the machine learning models plus the sum of the performance of each machine learning model for each individual party.

A method for controlling access to a machine learning model, the method comprising:
 at a trusted computing environment storing the machine learning model and training data;
 using an access controller to allow or deny access to the machine learning model;
 at a memory storing criteria submitted by a party requesting access to the machine learning model;
 computing a score using the criteria;
 and using the computed score to allow or deny access to the machine learning model.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A system comprising:
a processor; and
a memory storing instructions that upon execution by the processor perform operations comprising:
executing a trusted computing environment configured to store a machine learning model and training data;
storing criteria to access the machine learning model, the criteria indicating performance of the machine learning model;
computing a score using the criteria and a characteristic function, the characteristic function being equal to a performance of the machine learning model plus a sum of the performance of the machine learning model for each individual party; and
controlling access to the machine learning model based on the computed score.

2. The system of claim 1, wherein the criteria comprises validation data based on which only information relevant to a validation task is released through the machine learning model.

3. The system of claim 1, wherein the processor performs further operations comprising preventing, from accessing the machine learning model, another party which submits the training data, but not the criteria, to the trusted computing environment.

4. The system of claim 1, wherein the processor performs further operations comprising using the computed score to grant timed access to the machine learning model, the time being related to the score.

5. The system of claim 1, wherein the processor performs further operations comprising preventing access to the machine learning model by a malicious party submitting the training data which has already been submitted.

6. The system of claim 1, wherein the score is computed as a Shapley value that quantifies an average marginal contribution of a party with respect to all subsets of a plurality of parties.

7. The system of claim 1, wherein:
the trusted computing environment is further configured to store a plurality of machine learning models, the plurality of machine learning models including one machine learning model per party, and
wherein the characteristic function is equal to a sum of a performance of all the machine learning models plus a sum of a performance of each machine learning model for each individual party.

8. A computer storage medium storing instructions that upon execution by a processor perform operations comprising:
executing a trusted computing environment configured to store a machine learning model and training data;
storing criteria to access the machine learning model, the criteria indicating performance of the machine learning model;
computing a score using the criteria and a characteristic function, the characteristic function being equal to a performance of the machine learning model plus a sum of the performance of the machine learning model for each individual party; and
controlling access to the machine learning mode based on the computed score.

9. The computer storage medium of claim 8, wherein the criteria comprises validation data based on which only information relevant to a validation task is released through the machine learning model.

10. The computer storage medium of claim 8, wherein the processor performs further operations comprising preventing, from accessing the machine learning model, another party which submits the training data, but not the criteria, to the trusted computing environment.

11. The computer storage medium of claim 8, wherein the processor performs further operations comprising using the computed score to grant timed access to the machine learning model, the time being related to the score.

12. The computer storage medium of claim 8, wherein the processor performs further operations comprising preventing access to the machine learning model by a malicious party submitting the training data which has already been submitted.

13. The computer storage medium of claim 8, wherein the score is computed as a Shapley value that quantifies an average marginal contribution of a party with respect to all subsets of a plurality of parties.

14. The computer storage medium of claim 8, wherein:
the trusted computing environment is further configured to store a plurality of machine learning models, the plurality of machine learning models including one machine learning model per party, and
wherein the characteristic function is equal to a sum of a performance of all the machine learning models plus a sum of a performance of each machine learning model for each individual party.

15. A method comprising:
executing a trusted computing environment configured to store a machine learning model and training data;
storing, on a memory, criteria to access the machine learning model, the criteria indicating performance of the machine learning model;
computing, by a participation controller, a score using the criteria and a characteristic function, the characteristic function being equal to a performance of the machine learning model plus a sum of the performance of the machine learning model for each individual party; and
based on the computed score, controlling, by an access controller, access to the machine learning model.

16. The method of claim 15, further comprising preventing, by the access controller, another party which submits training data, but not criteria, to the trusted computing environment, from accessing the machine learning model.

17. The method of claim 15, further comprising:
granting, by the access controller, timed access to the machine learning model using the computed score, wherein the time is related to the computed score.

18. The method of claim 15, wherein the method further comprises preventing, by the access controller, access to the machine learning model by a malicious party submitting training data which has already been submitted.

19. The method of claim 15, wherein the score is computed as a Shapley value that quantifies an average marginal contribution of a party with respect to all subsets of a plurality of parties.

20. The method of claim 15, further comprising:
- storing, by the trusted computing environment, a plurality of machine learning models, the plurality of machine learning models including one machine learning model per party, and
- wherein the characteristic function is equal to a sum of a performance of all the machine learning models plus a sum of a performance of each machine learning model for each individual party.

* * * * *